United States Patent [19]
Shiino et al.

[11] Patent Number: 5,611,010
[45] Date of Patent: Mar. 11, 1997

[54] GUIDE PIN INSERTION MEMBER FOR INSERTING GUIDE PINS INTO AN OPTICAL FIBER CONNECTOR

[75] Inventors: Masato Shiino, Tokyo; Mikio Tsutsumi; Shiji Nagasawa, both of Mito, all of Japan

[73] Assignees: The Furukawa Electric Co., Ltd.; Nippon Telegraph and Telephone Corporation, both of Tokyo, Japan

[21] Appl. No.: 513,446

[22] Filed: Aug. 10, 1995

[30] Foreign Application Priority Data

Aug. 18, 1994 [JP] Japan .................................. 6-194323
Mar. 1, 1995 [JP] Japan .................................. 7-042060

[51] Int. Cl.$^6$ .................................................. G02B 6/36
[52] U.S. Cl. .................................... 385/53; 29/750
[58] Field of Search ................... 385/53, 55, 56, 385/59, 60, 76, 77, 78, 81, 83; 29/739, 741, 747, 749, 750, 758, 760, 764

[56] References Cited

U.S. PATENT DOCUMENTS

| | | | |
|---|---|---|---|
| 4,204,319 | 5/1980 | Bishop | 29/739 |
| 4,206,543 | 6/1980 | Chisholm | 29/739 |
| 4,285,123 | 8/1981 | Chisholm | 29/764 |
| 4,950,048 | 8/1990 | Kakii et al. | 385/83 |

Primary Examiner—John D. Lee
Attorney, Agent, or Firm—Frishauf, Holtz, Goodman, Langer & Chick

[57] ABSTRACT

A pin insertion member for inserting guide pins into pin holes of an optical fiber connector includes a retaining portion for holding at least two guide pins such that one-end portions of the at least two guide pins project from the retaining portion. The retaining portion includes retaining holes for holding other-end portions of the at least two guide pins with a predetermined space therebetween in a widthwise direction, and the pin insertion member has a plurality of slits between the retaining holes and an outer surface of the retaining portion, whereby the at least two guide pins are adapted to be insertable at a stroke into corresponding pin holes of an optical fiber connector.

14 Claims, 20 Drawing Sheets

FIG. 10
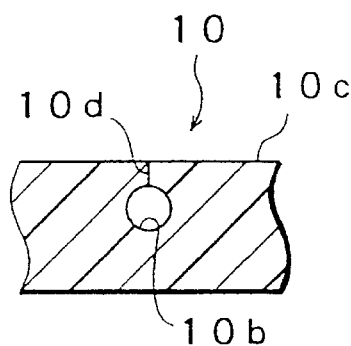
FIG. 11A  FIG. 11B
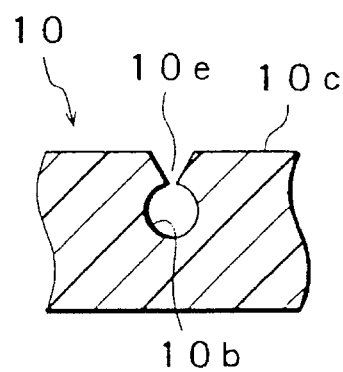 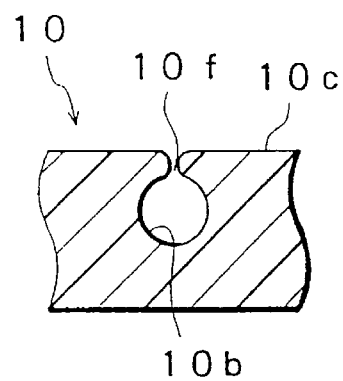
FIG. 12
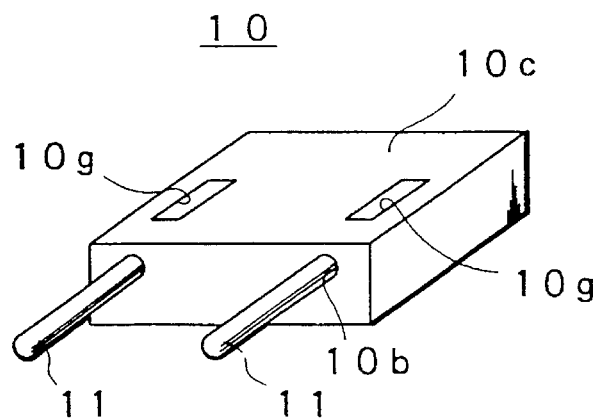

GUIDE PIN INSERTION MEMBER FOR INSERTING GUIDE PINS INTO AN OPTICAL FIBER CONNECTOR

BACKGROUND OF THE INVENTION

1. Field of the Invention

The present invention relates to pin insertion members used in inserting guide pins into pin holes of optical fiber connectors.

2. Description of the Related Art

In butt-connecting optical fiber connectors, such as multifiber connectors, a multifiber connector 1 shown in FIG. 40, for example, is used in order to stabilize the connecting properties and reduce connection losses.

In the multifiber connector 1, a plurality of optical fibers 3a, which constitute a ribbonfiber 3, are inserted in and bonded to a plurality of fiber holes which are bored through a ferrule 2. The respective end faces of the fibers 3a which are exposed to a butting end face 2a are polished together with the end face 2a by micro-lapping or the like. Also, the ferrule 2 is formed with a pair of pin holes 2b on either side with respect to the crosswise direction.

The multifiber connector 1 constructed in this manner is butt-connected to another one in a manner such that a pair of guide pins (not shown) are inserted individually into the pin holes 2b. In doing this, the guide pins are also inserted into the pin holes 2b of the second multifiber connector 1, so that the two optical fiber connectors are positioned with respect to each other.

Usually, the operation for butting the optical fiber connectors is carried out on the scene of construction where existing optical fiber cables are laid, that is, in a narrow, dark space such as a manhole, and includes handling minute guide pins as short as several millimeters, so that the operating efficiency is poor. Moreover, the guide pins are liable to be lost, and their insertion into the pin holes takes much time. In the case where a plurality of optical fiber connectors are stacked in layers or arranged crosswise, in particular, the insertion of the connectors into the pin holes is an extremely troublesome task.

SUMMARY OF THE INVENTION

A first object of the present invention is to provide a pin insertion member which facilitates inserting guide pins at a stroke into pin holes of optical fiber connectors without being lost. A second object of the invention is to provide a pin insertion member adapted for use with a large number of optical fiber connectors.

In order to achieve the first object described above, according to a first embodiment, there is provided a pin insertion member for inserting guide pins into pin holes of an optical fiber connector, comprising a retaining portion allowing one-side end portions of at least two guide pins to project for holding other-side end portions of the guide pins, whereby the guide pins are inserted at a stroke into corresponding pin holes of the optical fiber connector.

Preferably, the pin insertion member is formed of a flexible material and has the shape of a flat rectangular parallelepiped.

Preferably, moreover, the retaining portion includes retaining holes located with a bias toward one outer surface with respect to the thickness direction and adapted to hold the other-side end portions of the guide pins with the predetermined crosswise space between the guide pins.

Preferably, the pin insertion member is formed with slits between the retaining holes and the outer surface nearer to the retaining holes.

Preferably, each of the slits is formed along the entire length between the outer surface and each corresponding retaining hole.

Preferably, each of the slits intermittently in the longitudinal direction between the outer surface and each corresponding retaining hole.

Preferably, each of the slits is in the form of a cut between the outer surface and each corresponding retaining hole on a side of the outer surface or the retaining hole.

Preferably, moreover, the pin insertion member is formed with fracture grooves on those portions of the outer surface situated adjacent to the retaining holes, individually.

Preferably, the retaining portion includes retaining grooves located with a bias toward one outer surface with respect to a thickness direction and adapted to hold the other-side end portions of the guide pins with the predetermined crosswise space between the guide pins.

Preferably, furthermore, the pin insertion member has the shape of a flat rectangular parallelepiped, and an end face thereof from which the guide pins project is chamfered on the side of the other outer surface with respect to the thickness direction.

Preferably, the retaining portion includes a retaining surface of one outer surface with respect to the thickness direction, and the guide pins are held by retaining means removably mounted on the retaining surface.

Preferably, the retaining means is an adhesive tape stuck on the retaining surface or an elastic cover attached to the retaining surface by means of adhesive means.

Preferably, moreover, the pin insertion member is formed with positioning grooves for positioning the guide pins on the retaining surface.

Preferably, the retaining portion includes a retaining surface of one outer surface with respect to the thickness direction, and the pin insertion member is a magnet formed with positioning grooves for positioning the guide pins on the retaining surface.

Preferably, the pin insertion member is provided with connecting portions individually on opposite sides with respect to the crosswise direction thereof, the connecting portions connecting the pin insertion member and another pin insertion member.

Preferably, furthermore, the pin insertion member is provided with a laminating portion for facilitating the pin insertion member to be stacked on another pin insertion member.

In order to achieve the second object, according to an alternate embodiment of the present invention, there is provided a pin insertion member for inserting guide pins at a stroke into pin holes of a plurality of optical fiber connectors stacked in layers, each of the optical fiber connectors having at least two pin holes formed with a predetermined pitch, comprising: a regulating member for regulating the pitch of the guide pins inserted into the pin holes of the optical fiber connectors; and retaining members removably mounted on opposite sides of the regulating member, individually, and serving, in conjunction with the regulating member, to hold the guide pins so that one-side end portions of the guide pins project.

Preferably, the pin insertion member is a molded resin product formed of the regulating member and the retaining members connected by means of hinges.

According to the first embodiment of the present invention based on the arrangement described above, there is provided a pin insertion member which facilities guide pins to be inserted at a stroke into pin holes of optical fiber connectors without being lost.

If the pin insertion member is formed of a flexible material and has the shape of a flat rectangular parallelepiped, it can be fractured and removed by means of the guide pins after the guide pins are inserted individually into the pin holes of the multifiber connector.

If the retaining portion includes retaining holes located with a bias toward one outer surface with respect to the thickness direction and adapted to hold the other-side end portions of the guide pins with the predetermined crosswise space between the guide pins, moreover, those wall portions of the pin insertion member situated corresponding to the retaining holes are so thin that the insertion member can be fractured easily.

If the pin insertion member is formed with slits between the retaining holes and the outer surface nearer to the retaining holes, it can be fractured more easily.

If each of the slits is formed along the entire length between the outer surface and each corresponding retaining hole, or is formed to extend intermittently in the longitudinal direction between the outer surface and each corresponding retaining hole, or is in the form of a cut between the outer surface and each corresponding retaining hole on the side of the outer surface or the retaining hole, then the slit can be properly used depending on the flexible material of the pin insertion member.

Also if the pin insertion member is formed with fracture grooves, in place of the slits, on those portions of the outer surface situated adjacent to the retaining holes, individually, it can be fractured with ease.

If the retaining portion includes retaining grooves located with a bias toward one outer surface with respect to the thickness direction and adapted to hold the other-side end portions of the guide pins with the predetermined crosswise space between the guide pins, moreover, the held guide pins can be easily disengaged from the pin insertion member.

If the pin insertion member has the shape of a flat rectangular parallelepiped, and if that end face thereof from which the guide pins project is chamfered on the side of the other outer surface with respect to the thickness direction, furthermore, the guide pins can be disengaged from the insertion member without causing the pin insertion member to interfere with the optical fiber connector after the guide pins are inserted individually into the pin holes of the optical fiber connector.

If the retaining portion includes a retaining surface of one outer surface with respect to the thickness direction, and the guide pins are held by retaining means removably mounted on the retaining surface, the holding operation and the removal of the pin insertion member can be facilitated.

If the retaining means is an adhesive tape stuck on the retaining surface or an elastic cover attached to the retaining surface by means of adhesive means, the holding operation and the removal of the pin insertion member can be further facilitated.

If the pin insertion member is formed with positioning grooves for positioning the guide pins on the retaining surface, moreover, the guide pins can be positioned so that they can be easily inserted into the pin holes of the optical fiber connector.

If the retaining portion includes a retaining surface of one outer surface with respect to the thickness direction, and if the pin insertion member is a magnet formed with positioning grooves for positioning the guide pins on the retaining surface, the construction of the pin insertion member can be made very simple.

If the pin insertion member is provided with connecting portions which are located individually on the opposite sides with respect to the crosswise direction thereof and connect the pin insertion member and another pin insertion member, the insertion members can be connected in the crosswise direction so that the guide pins can be inserted at the same time into a large number of optical fiber connectors.

If the pin insertion member is provided with a laminating portion for facilitating the pin insertion member to be stacked on another pin insertion member, furthermore, the insertion member can be vertically stacked in layers, so that the guide pins can be inserted at the same time into a large number of optical fiber connectors.

According to the alternate embodiment of the present invention based on the arrangement described above, there is provided a pin insertion member adapted for use with a large number of optical fiber connectors, in addition to the aforementioned effects of the first embodiment.

If the pin insertion member is formed integrally from plastics and designed so that the regulating member and the retaining members are connected by means of hinges, the number of components can be reduced markedly, so that the manufacturing cost and hence prices can be reduced.

The above and other objects, features, and advantages of the invention will be more apparent from the ensuing detailed description taken in connection with the accompanying drawings.

BRIEF DESCRIPTION OF THE DRAWINGS

FIG. 10 is a cross-sectional view showing a retaining hole and a slit of the pin insertion member of FIG. 9;

FIGS. 11A and 11B are sectional views showing alternative examples of the slit in the pin insertion member;

FIG. 12 is a perspective view showing another example of the slit;

DETAILED DESCRIPTION OF THE PREFERRED EMBODIMENTS

Figure 1:
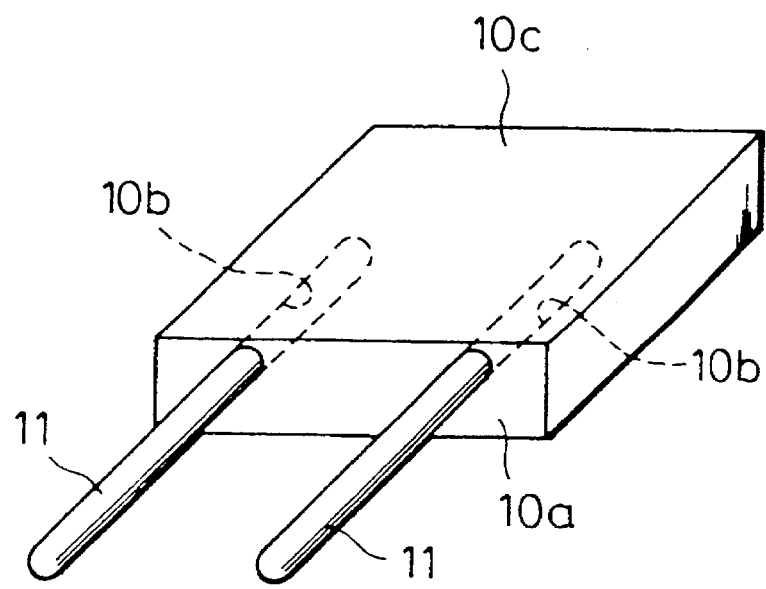
FIG. 1 is a perspective view of a pin insertion member according to the present embodiment of a first invention.
Figure 2:
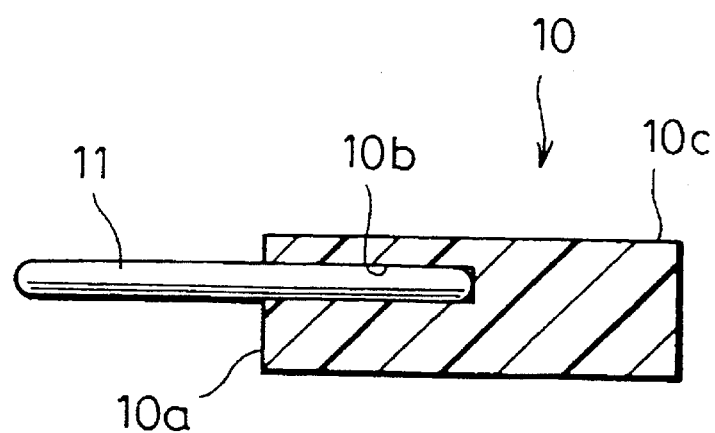
FIG. 2 is a sectional view of the pin insertion member of FIG. 1.

Preferred embodiments of pin insertion members according to the present invention will now be described in detail.

Referring first to FIGS. 1 to 15, a first embodiment of the pin insertion members will be described. In this case, a retaining portion for holding at least two guide pins comprises retaining holes.

In the description to follow, the multifiber connector 1 described in connection with the related art will be used as an optical fiber connector into which the guide pins are inserted with use of the insertion members according to the present invention. Therefore, like reference numerals are used to designate corresponding portions of the multifiber connector throughout the drawings.

A pin insertion member (hereinafter referred to simply as insertion member) 10 is formed of a flexible material, such as expanded plastics (e.g., polyethylene, urethane, etc.), rubber (e.g., natural rubber, synthetic rubber, etc.), vinyl (e.g., PVC loaded with plasticizer, etc.), or paper, and has the shape of a flat rectangular parallelepiped. As shown in FIG. 1, the insertion member 10 is formed with a pair of retaining holes 10b which open in a front end face 10a and extend substantially to the center in the longitudinal direction (see FIG. 2). Each retaining hole 10b has a circular cross section, and is biased to the side of an upper surface 10c of the insertion member 10. Also, the two retaining holes 10b extend parallel to each other with a predetermined crosswise space between them corresponding to the distance between the pin holes 2b of the multifiber connector 1. The insertion member 10 holds two guide pins 11 in a manner such that one end portion of each pin 11 projects from the end face 10a and the other end portion is inserted into its corresponding retaining hole 10b.

The insertion member 10, having the construction described above, is used in the following manner as the two guide pins 11 are inserted at a stroke into the multifiber connector 1.

Figure 3:
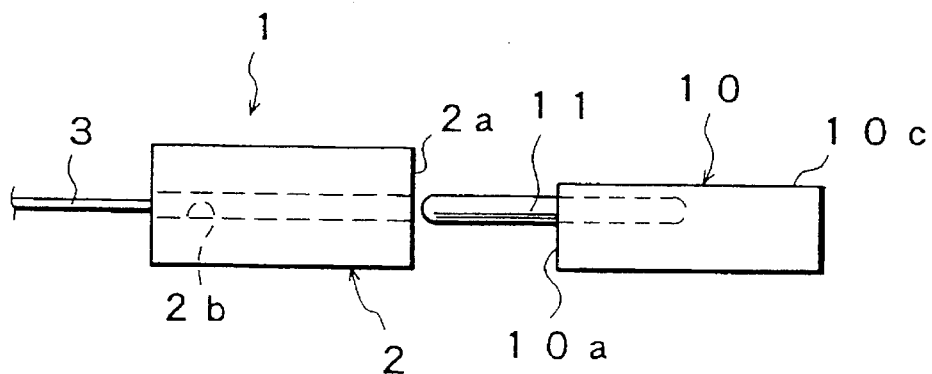
FIG. 3 is a side view for illustrating the way guide pins are inserted into a multifiber connector by means of the pin insertion member of FIG. 1.

First, the insertion member 10, having the guide pins 11 held individually in its retaining holes 10b, is prepared in advance, as shown in FIG. 1, and the end face 10a is opposed to the butting end face 2a of the multifiber connector 1, as shown in FIG. 3.

Figure 4:
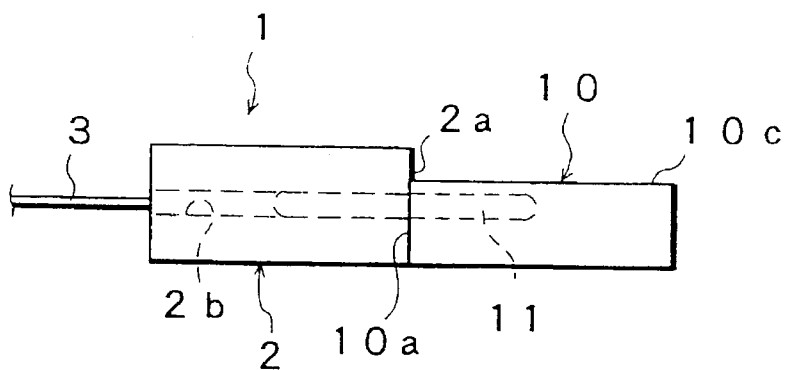
FIG. 4 is a side view for illustrating the way the guide pins are inserted into the multifiber connector.

Then, the end face 10a of the insertion member 10 is caused to butt against the butting end face 2a of the multifiber connector 1, as shown in FIG. 4. Thereupon, the two guide pins 11 held by the insertion member 10 can be easily inserted at a stroke into their corresponding pin holes 2b of the connector 1. As each guide pin 11 is inserted into its corresponding pin hole 2b of the multifiber connector 1, it is subjected to a small reaction force. Since the rear end of each pin 11 then abuts against the bottom of its corresponding retaining hole 10b, however, the pin 11 never recedes.

Figure 5:
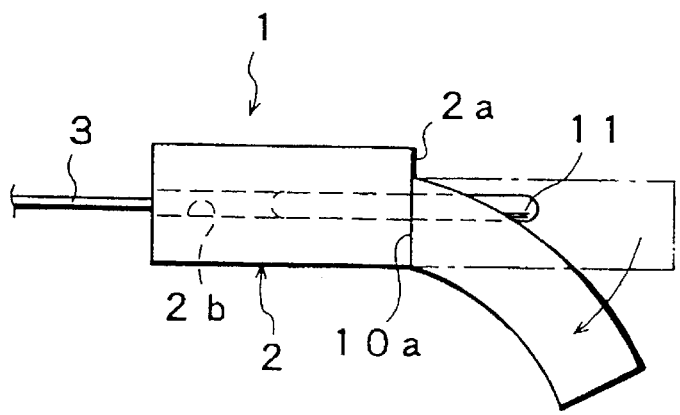
FIG. 5 is a side view showing a state in which the pin insertion member is fractured after the guide pins are inserted into the multifiber connector.
Figure 6:
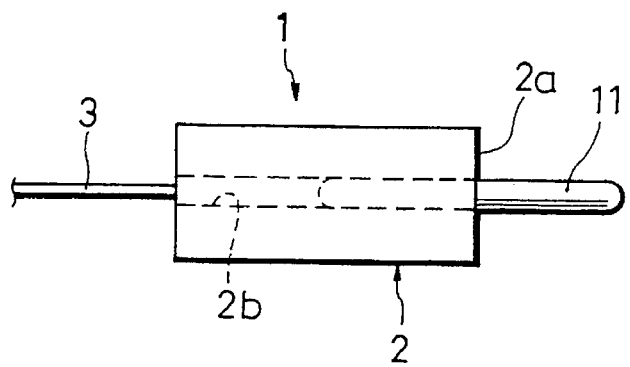
FIG. 6 is a side view showing a state after the pin insertion member is removed from the multifiber connector with the guide pins inserted therein.

Subsequently, the rear portion of the upper surface 10c of the insertion member 10 is depressed downward at right angles to the butting direction with respect to the multifiber connector 1, as indicated by the arrow in FIG. 5. Thereupon, the insertion member 10, formed of a flexible material, bends downward from the rear side, so that the rear-side regions of the member 10 between the retaining holes 10b and the upper surface 10c are fractured by the two guide pins 11 held in position. In the end, the insertion member 10 is disengaged from the guide pins 11. Thus, the multifiber connector 1 is obtained having the guide pins 11 in its pin holes 2b, as shown in FIG. 6, and the insertion member 10, cleared of the two guide pins 11, is scrapped.

As shown in FIG. 1, the retaining holes 10b are biased to the side of the upper surface 10c of the flexible insertion member 10, and the wall portions between the holes 10b and the surface 10c are thin. If the rear side of the insertion member 10 is only depressed, therefore, the member 10 can be easily fractured at the portions corresponding to the retaining holes 10b by the guide pins 11.

Moreover, the guide pins 11 are inserted by only handling the insertion member 10 which holds the pins 11 in advance, so that there is no possibility of their being lost.

Figure 7A:
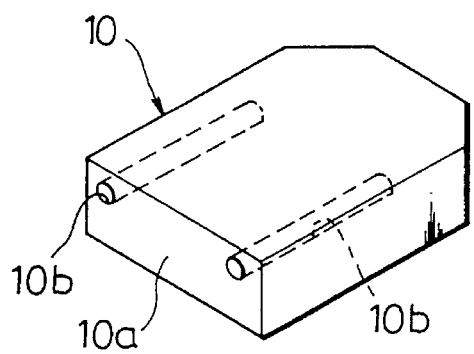
FIGS. 7A, 7B, 7C and 7D are perspective views showing modifications of the configuration of the pin insertion member.
Figure 7B:
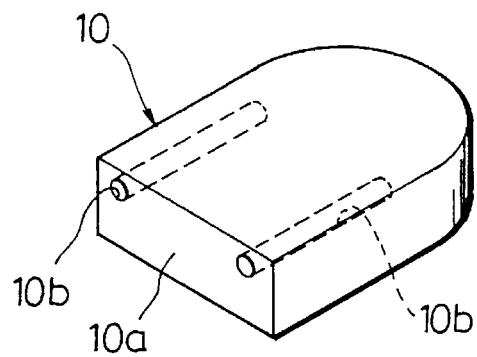
Figure 7C:
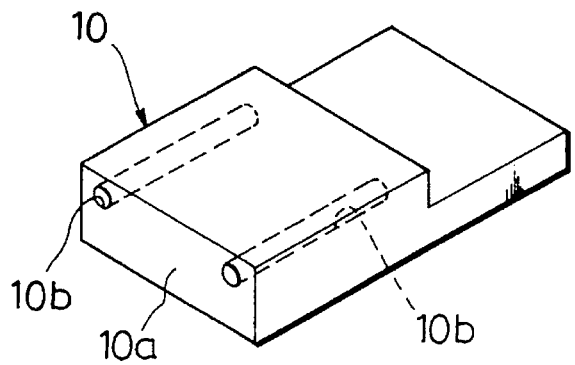
Figure 7D:
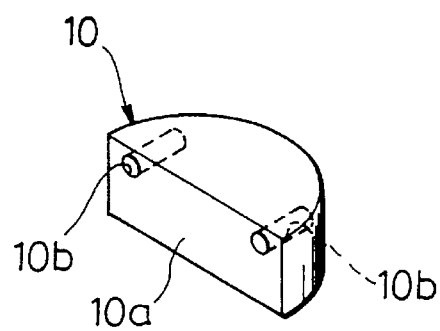

It is to be understood that the insertion member 10 is not limited to the aforesaid shape of the flat rectangular parallelepiped. As shown in FIGS. 7A to 7D, for example, the insertion member 10 may be a structure with cut rear corners (FIG. 7A), structure with a semicircular rear end portion (FIG. 7B), structure with a stepped rear end portion (FIG. 7C), or semicircular structure (FIG. 7D).

Figure 8A:
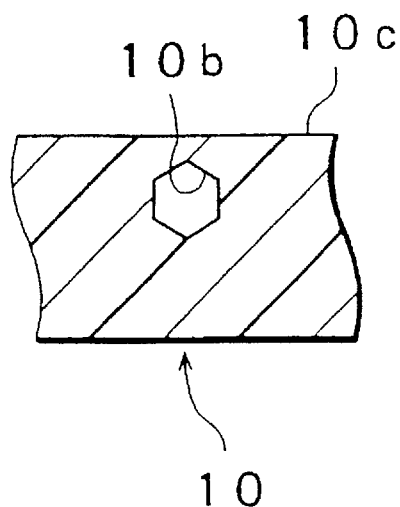
FIGS. 8A and 8B are side views showing alternative examples of the shape of retaining holes of the pin insertion member.
Figure 8B:
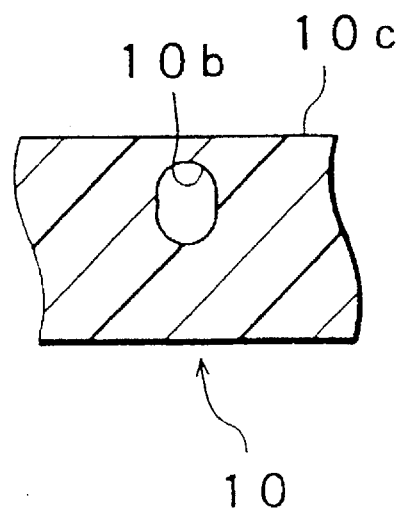

The cross section of each retaining hole 10b in the insertion member 10 is not limited to the circular shape, and may be hexagonal, as shown in FIG. 8A, or oval, as shown in FIG. 8B, for example, provided that the hole 10b can retain its corresponding guide pin 11.

The bias of the retaining holes 10b toward the upper surface 10c is suitably selected depending on the flexible material used so that the insertion member 10 can be easily fractured at the portions corresponding to the retaining holes 10b by the guide pins 11, and can be readily disengaged from the pins 11.

Figure 9:
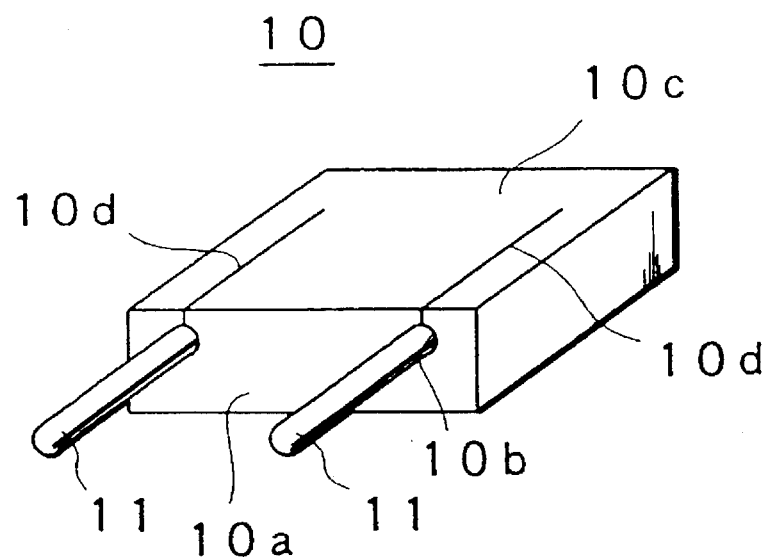
FIG. 9 is a perspective view of a pin insertion member formed with slits.

Alternatively, as shown in FIGS. 9 and 10, the insertion member 10 may be designed so that a slit 10d is formed between each retaining hole 10b and the upper surface 10c in order to allow the insertion member 10 to be readily disengaged from the guide pins 11.

With this arrangement, the insertion member 10 can be readily disengaged form the guide pins 11 after the pins 11 are inserted at a stroke into the pin holes 2b of the multifiber connector 1. Thus, when the rear side of the insertion member 10 is depressed downward in the same manner as aforesaid, the guide pins 11 can be easily removed from the member 10 through the slits 10d, since the wall portions between the retaining holes 10b and the surface 10c are thin.

Each slit in the insertion member 10 may be a wide slit 10e in the form of a V-groove cut between each retaining hole 10b and the upper surface 10c, as shown in FIG. 11A, or a wide slit 10f arcuately cut between each retaining hole 10b and the upper surface 10c, as shown in FIG. 11B. Alternatively, a wide slit or slot 10g may be formed by partially cutting a region which extends along each retaining hole 10b between the hole 10b and the upper surface 10c, as shown in FIG. 12.

If each slit in the insertion member 10 is a wide one, as shown in FIG. 11 or 12, the insertion member 10 can be readily disengaged from the guide pins 11 even in the case where the flexible material of the insertion member 10 is relatively rigid.

Figure 13:
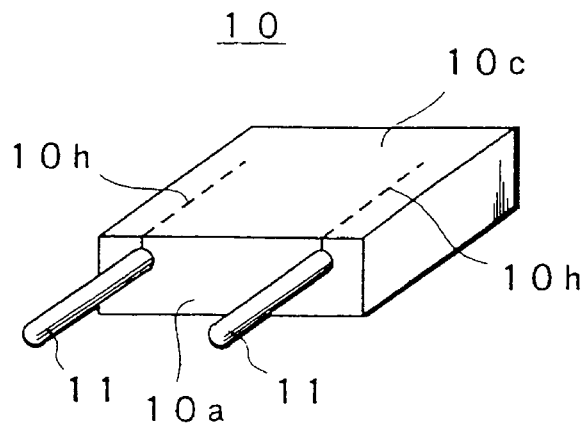
FIG. 13 is a perspective view of a pin insertion member having alternative slits.
Figures 14A, 14B:
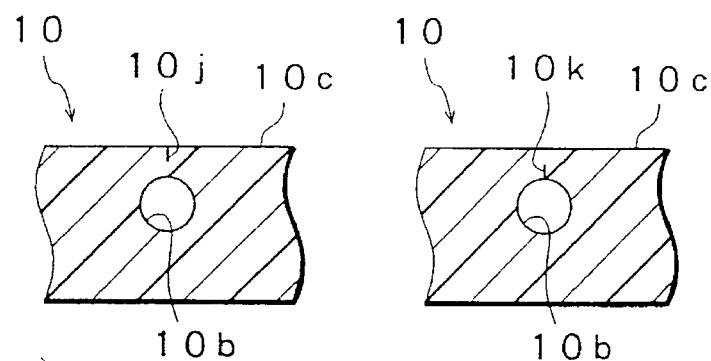
FIGS. 14A and 14B are sectional views showing further examples of the slit.

Alternatively, each slit in the insertion member 10 may be an intermittent slit 10h in the form of a series of perforations, as shown in FIG. 13, a slit 10j cut only on the side of the upper surface 10c, as shown in FIG. 14A, or a slit 10k cut only the side of each retaining hole 10b, as shown in FIG. 14B.

The slits shown in FIGS. 13 and 14 are used in the case the material of the insertion member 10 is more flexible than the material of the one formed with the slits shown in FIGS. 11 or 12.

Figure 15:
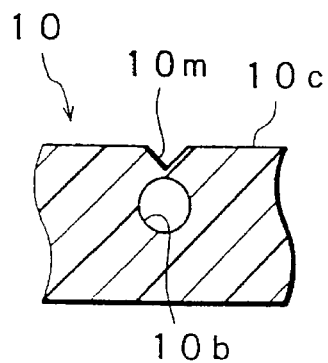
FIG. 15 is a sectional view showing a fracture groove on the pin insertion member.

As shown in FIG. 15, furthermore, a V-groove 10m for fracture may be formed in a region of the upper surface 10c adjacent to each retaining hole 10b, depending on the flexible material used. Also in this case, the wall portions between the retaining holes 10b and the upper surface 10c are thin, so that the portions corresponding to the retaining holes 10b can be fractured by the guide pins 11 as the rear side of the insertion member 10 is pressed down. Thus, the insertion member 10 can be easily disengaged from the guide pins 11.

Referring now to FIGS. 35 to 39, a variation of the first embodiment of the present invention will be described.

Figure 35:
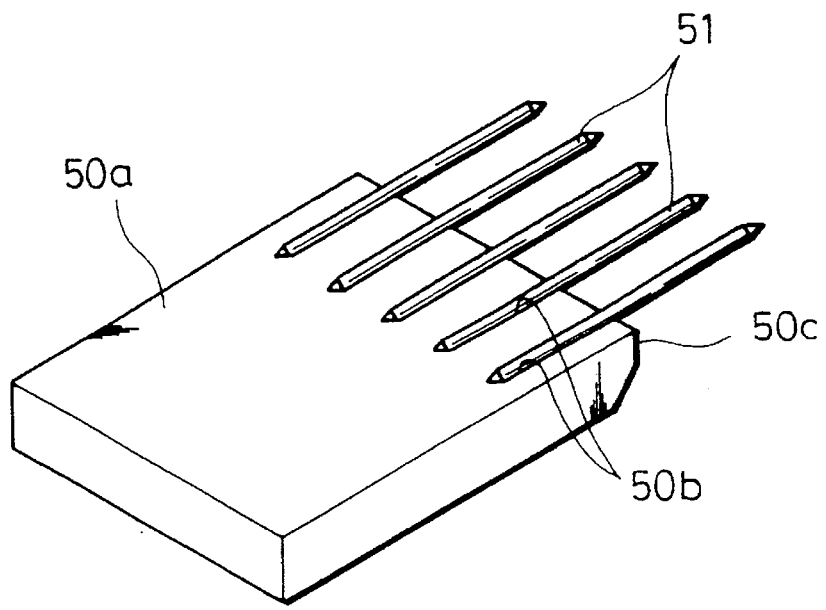
FIG. 35 is a perspective view of a pin insertion member according to a variation of the first embodiment of the present invention.
Figure 36:
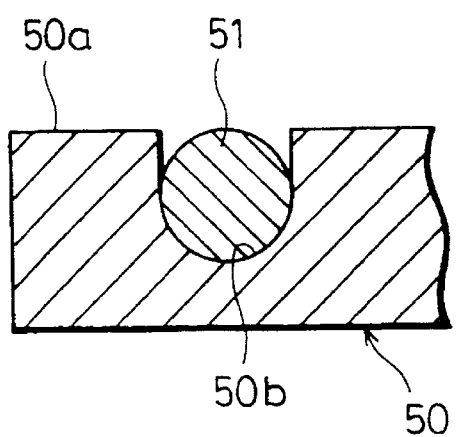
FIG. 36 is a front sectional view showing a configuration of a retaining groove on the pin insertion member shown in FIG. 35.

An insertion member 50 has the shape of a flat rectangular parallelepiped, and is formed of, for example, plastics (e.g., moldings of ABS, PP, PE, etc.) or metal (e.g., castings or machined product of iron, aluminum, etc.). As shown in FIG. 35, a guide pin 51 is held in each of a plurality of retaining grooves 50b which are formed on an upper surface 50a of the insertion member 50. The lower part of a front end face 50c of the insertion member 50 is chamfered to form a slanting surface. As shown in the cross-sectional view of FIG. 36, the bottom portion of each retaining groove 50b has a circular shape which matches the shape of each guide pin 51. The guide pins 51 are held parallel to one another at predetermined crosswise intervals corresponding to the distance between the pin holes of the multifiber connector so that one end portion of each pin 51 projects from the end face 50c of the insertion member 50. The lower part of the end face 50c may be formed as a curved face.

Figure 37:
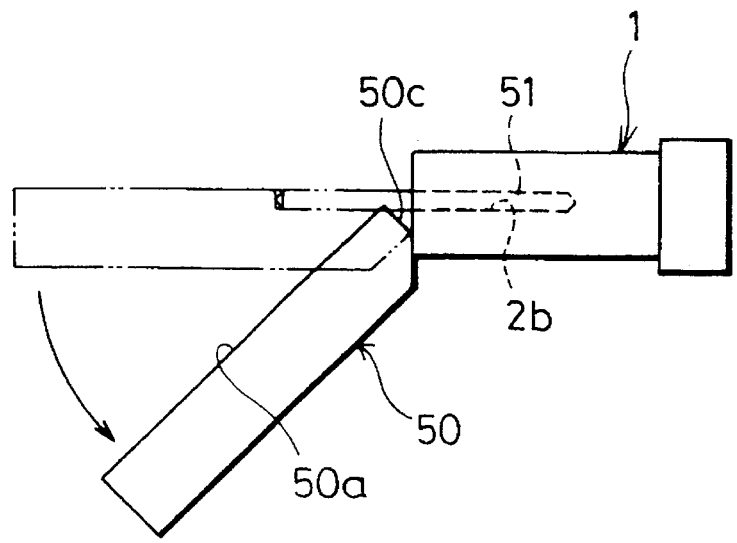
FIG. 37 is a sectional view illustrating the way of use of the pin insertion member shown in FIG. 35.

Thus, the guide pins 51 can be easily disengaged from the insertion member 50 by depressing the rear portion of the insertion member 50 as indicated by the arrow in FIG. 37 after causing the member 50 to butt against the multifiber connector 1 so that the pins 51 are inserted individually in the pin holes 2b of the connector 1. Since the lower part of the end face 50c of the insertion member 50 is sloped, moreover, the end face 50c never interferes with the connector 1, when depressed the rear portion of the insertion member 50.

Figure 38A:
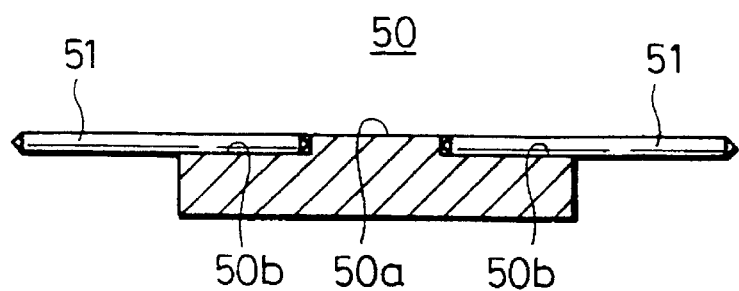
FIG. 38A and 38B are side sectional views showing alternative arrangements of guide pins on the pin insertion member of FIG. 35.
Figure 38B:
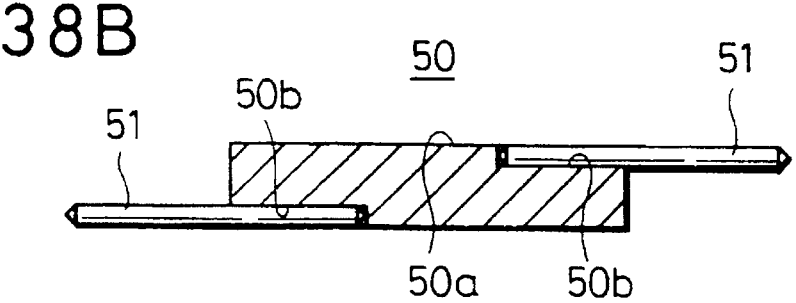

As shown in FIG. 38A, the insertion member 50 may be designed so that a plurality of retaining grooves 50b are formed in the front and in the rear on the upper surface 50a so that the guide pins 51 are held individually in the grooves 50b. Alternatively, the guide pins 51 may be held individually in a plurality of retaining grooves 50b which are formed on both the upper surface 50a and the lower surface of the insertion member 50, as shown in FIG. 38B.

Figure 39A:
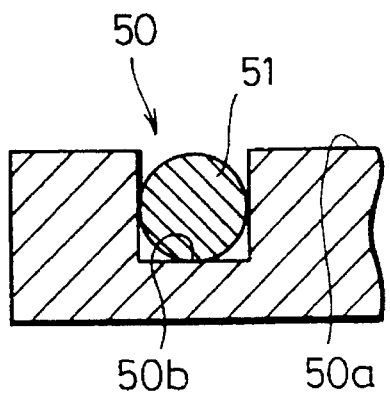
FIGS. 39A, 39B, 39C, 39D and 39E are front sectional views showing alternative configurations of retaining grooves of the pin insertion member.
Figure 39B:
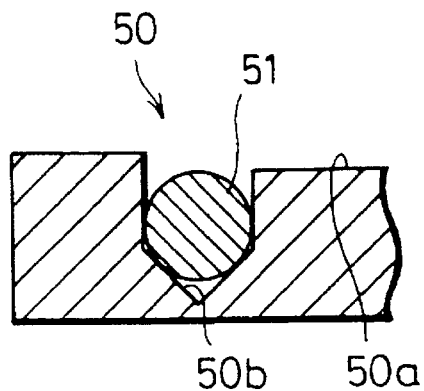
Figure 39C:
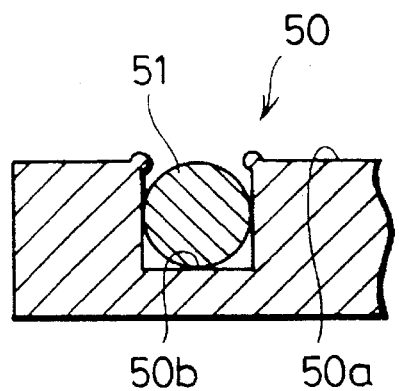
Figure 39D:
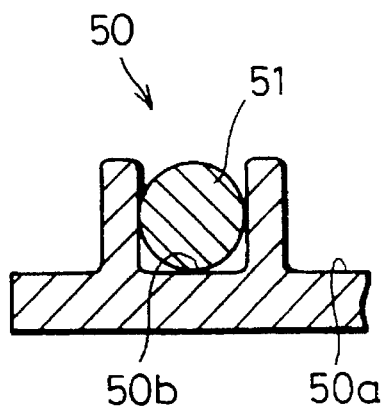
Figure 39E:
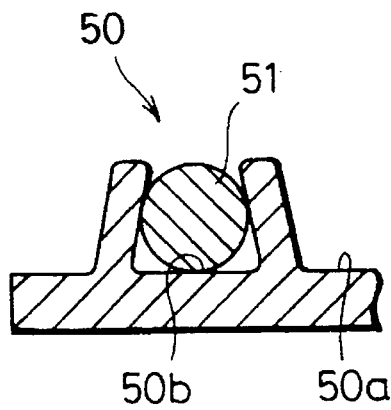
Figure 40:
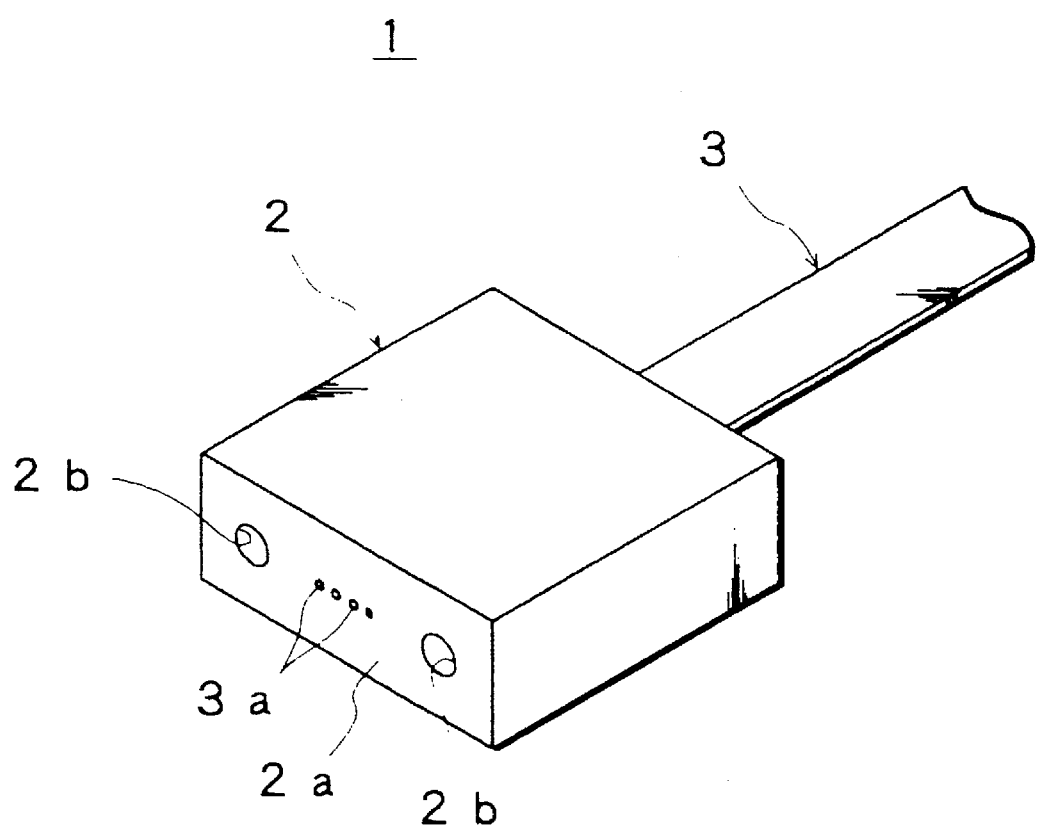
FIG. 40 is a perspective view of a multifiber connector used for reference in the description of a related art method for inserting guide pins into an optical fiber connectors.

The retaining grooves of the insertion member 50 may have various cross-sectional shapes, such as the ones shown in FIGS. 39A to 39E. The retaining grooves 50b shown in FIGS. 39A and 39D ensures ease of machining, while the retaining groove 50b shown in FIG. 39B allows the insertion member 50 to be fractured at its bottom portion, so that the guide pin 51 can be released with ease. Since the retaining grooves 50b shown in FIGS. 39C and 39E are tapered upward, the guide pins 51 cannot easily slip out of these grooves.

Referring now to FIGS. 16 to 20, a third embodiment of the present invention will be described.

Figure 16:
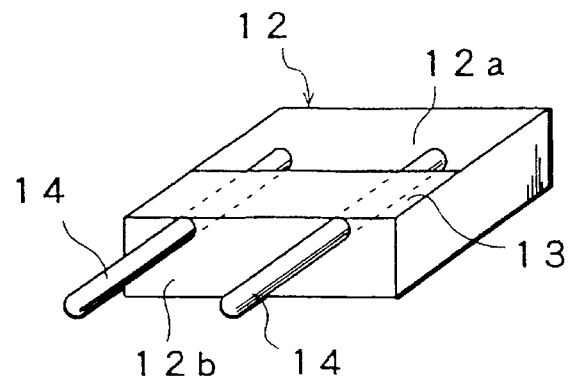
FIG. 16 is a perspective view showing a pin insertion member according to a third embodiment of the first invention.

An insertion member 12 has the shape of a flat rectangular parallelepiped, and is formed of, for example, plastics (e.g., moldings of ABS, PP, PE, etc.) or metal (e.g., castings or machined product of iron, aluminum, etc.). As shown in FIG. 16, two guide pins 14 are held by means of an adhesive tape 13 which is releasably stuck on an upper surface 12a of the insertion member 12. Thus, the upper surface 12a of the insertion member 12 serves as a retaining portion for the guide pins 14. The two guide pins 14 are held parallel to each other on the upper surface 12a with a predetermined crosswise space between them corresponding to the distance between the pin holes of the multifiber connector. One end portion of each pin 14 projects from an end face 12b of the insertion member 12, while the other end portion is fixed by means of the adhesive tape 13.

Thus, also in the present embodiment, the insertion member 12, having the two guide pins 14 held on its upper surface 12a by means of the adhesive tape 13, is prepared in advance, and the guide pins 14 can be easily inserted at a stroke into their corresponding pin holes of the multifiber connector by causing the insertion member 12 to butt against the connector.

The insertion member 12 can be removed from the multifiber connector by only separating the adhesive tape 13 from the upper surface 12a, so that the multifiber connector with the guide pins 14 inserted individually in its pin holes can be obtained with ease.

Figure 17:
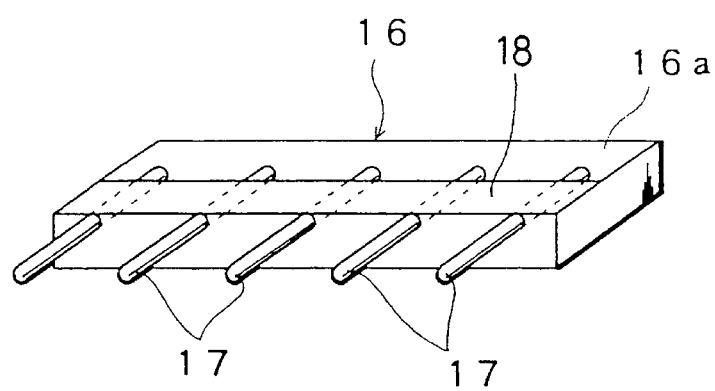
FIG. 17 is a perspective view showing a modification of the pin insertion member of the third embodiment.

As shown in FIG. 17, the insertion member 16 is elongated in the crosswise direction, and is designed so that three or more guide pins 17 are held on its upper surface 16a by means of an adhesive tape 18. With this arrangement, multifiber connectors which can receive the guide pins at one time are increased in number, so that the operating time for the insertion of the guide pins can be shortened.

Figure 18:
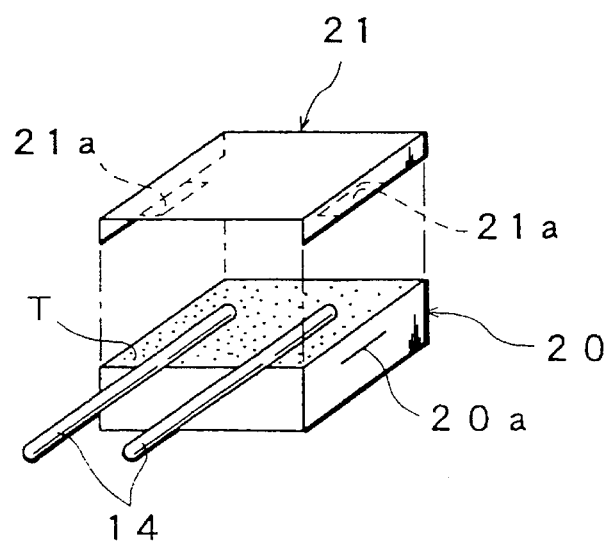
FIG. 18 is an exploded perspective view of an pin insertion member showing another modification of the third embodiment.

The insertion member 20 shown in FIG. 18 comprises a flat rectangular parallelepiped having an engaging slit 20a in each side face thereof with respect to the crosswise direction. This insertion member 20 is designed so that the two guide pins 14 are held in position by means of an elastic plastic cover 21 which is attached to the upper surface of the insertion member by means of a double-coated adhesive tape T. This insertion member 20 can be used in the same manner as aforesaid. The elastic cover 21 has engaging pieces 21a which protrude inward or downward from the opposite sides with respect to the crosswise direction and are adapted to engage the engaging slits 20a, individually. The cover 21 is formed of a pressed product of stainless steel or phosphor bronze or a molded resin product of ABS, PP or PE.

Figure 19:
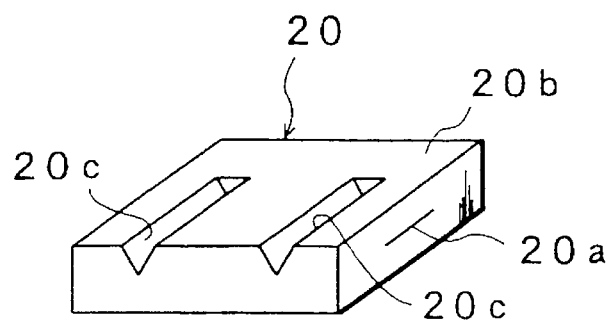
FIG. 19 is a perspective view showing positioning grooves formed on the pin insertion member of FIG. 18.
Figure 20:
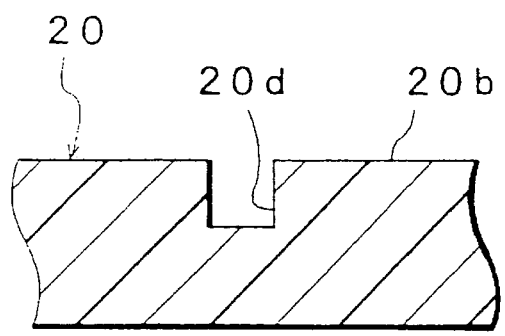
FIG. 20 is a sectional view showing another example of the positioning groove.

According to another modification of the present embodiment, a pair of V-shaped positioning grooves 20c are formed on an upper surface 20b of an insertion member 20, as shown in FIG. 19. With this arrangement, the guide pins can be positioned corresponding to the distance between the pin holes of the multifiber connector. The positioning grooves 20c need not always be V-shaped as long as they can position the guide pins properly. As shown in FIG. 20, for example, a positioning groove 20d may have a square cross section.

Figure 21:
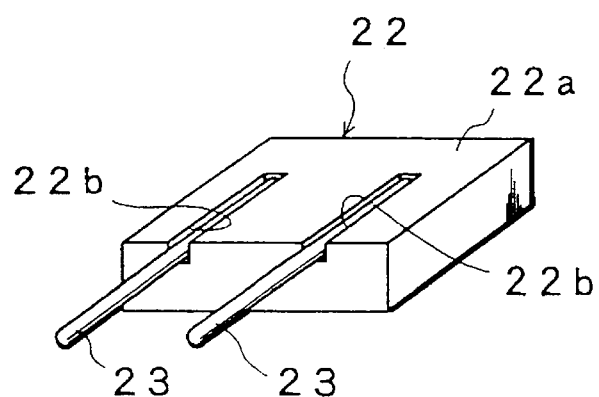
FIG. 21 is a perspective view showing a pin insertion member according to a fourth embodiment of the present invention.

Referring now to FIG. 21, a fourth embodiment of the present invention will be described.

An insertion member 22 according to the present embodiment is formed of a magnet having the shape of a flat rectangular parallelepiped. The insertion member 22 is formed with a pair of positioning grooves 22b extending substantially to the center of its upper surface 22a in the longitudinal direction thereof. The two positioning grooves 22b extend parallel to each other with a predetermined crosswise space between them corresponding to the distance between the pin holes of the multifiber connector.

The insertion member 22 is designed so that two guide pins 23 held individually in the positioning grooves 22b by magnetic force can be inserted at a stroke into their corresponding pin holes of the multifiber connector by causing the insertion member to butt against the connector.

The multifiber connector having the guide pins 23 inserted in the pin holes can be obtained by removing the insertion member 22 after the insertion. Since the guide pins 23 are inserted in their corresponding pin holes of the multifiber connector in this state, they are prevented from slipping out of the pin holes by the magnetic force of the insertion member 22.

According to a fifth embodiment of the present invention, the insertion members described in connection with the first to fourth embodiments may be used in a manner such that they are arranged side by side in the crosswise direction. If a plurality of insertion members are arranged at regular intervals on an adhesive tape, for example, the guide pins can be inserted at a stroke into the pin holes of a plurality of multifiber connectors.

Figure 22:
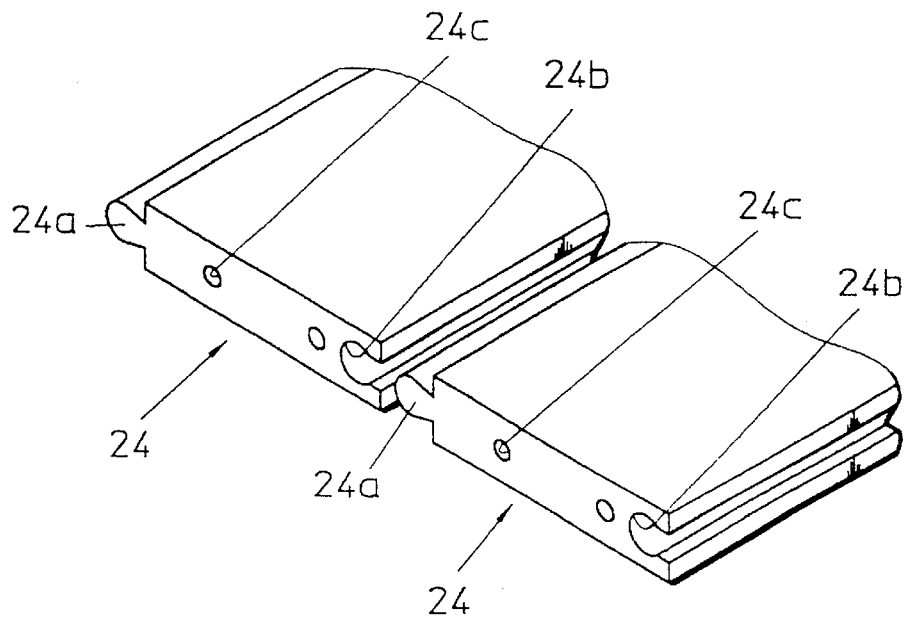
FIG. 22 is a perspective view showing pin insertion members according to a fifth embodiment of the present invention, the insertion members being arranged in the crosswise direction.

FIG. 22 shows insertion members 24 which each have a ridge 24a and a groove 24b extending in the butting direction and arranged individually on the opposite sides with respect to the crosswise direction. In this case, a plurality of insertion members 24 can be arranged side by side in a manner such that the respective ridges 24a and grooves 24b of the adjacent insertion members are in engagement with one another. Thus, the guide pins can be inserted at a stroke into the pin holes of a plurality of multifiber connectors if they are held individually in a pair of retaining holes 24c of each insertion member 24.

Figure 23:
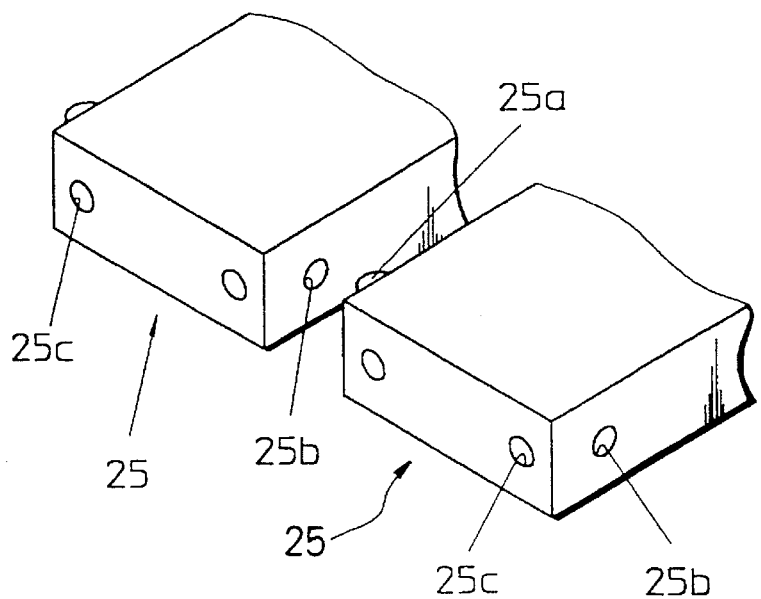
FIG. 23 is a perspective view showing a modification of the fifth embodiment.

FIG. 23 shows insertion members 25 which have a projection 25a and a recess 25b arranged individually on the opposite sides with respect to the crosswise direction each. In this case, a plurality of insertion members 25 can be arranged side by side in a manner such that the respective projections 25a and recesses 25b of the adjacent insertion members are in engagement with one another. In FIG. 23, numeral 25c denotes a retaining hole for holding a guide pin.

Figure 24:
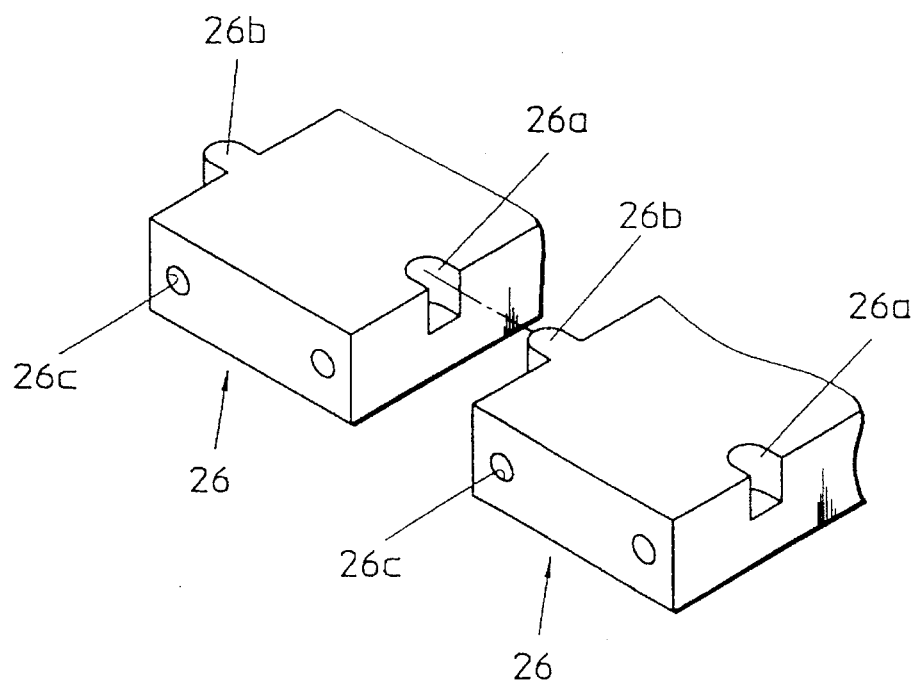
FIG. 24 is a perspective view showing another modification of the fifth embodiment.

FIG. 24 shows insertion members 26 which have a recess 26a and a projection 26b arranged individually on the opposite sides with respect to the crosswise direction each. In this case, a plurality of insertion members 26 can be arranged side by side in a manner such that the respective recesses 26a and projections 26b of the adjacent insertion members are in engagement with one another. In FIG. 24, numeral 26c denotes a retaining hole for holding a guide pin.

Figure 25:
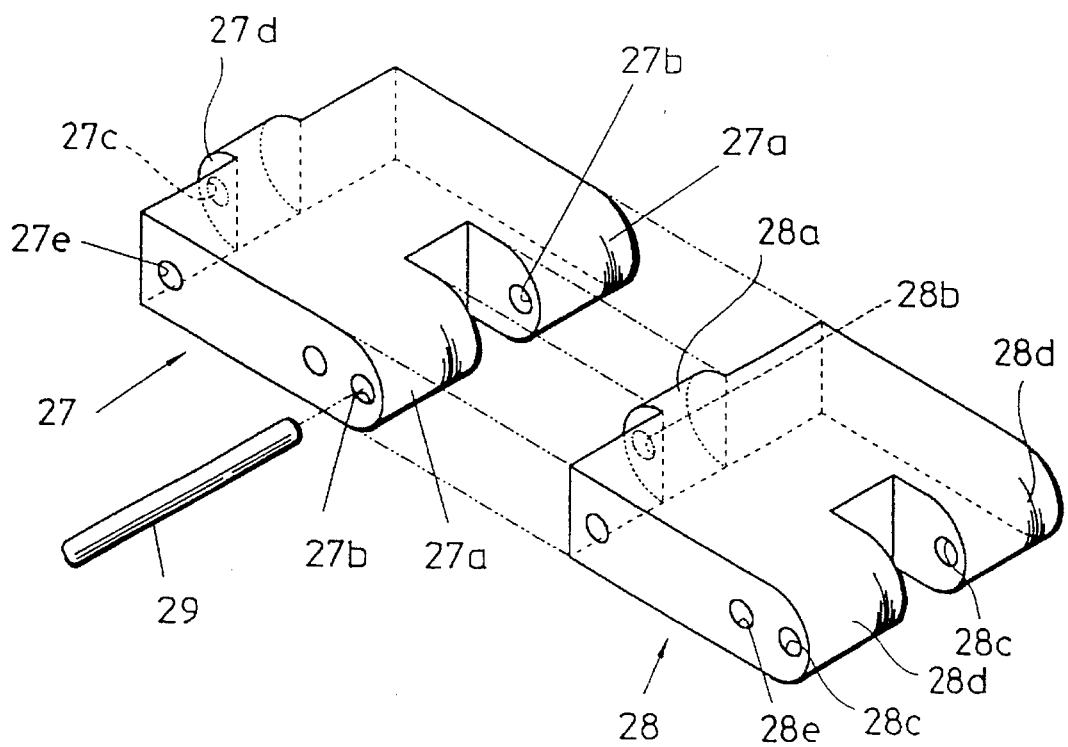
FIG. 25 is a perspective view showing still another modification of the fifth embodiment.

In arranging a plurality of insertion members, insertion members 27 and 28 may be used in the manner shown in FIG. 25.

The insertion member 27 has a pair of engaging pieces 27a protruding from its right-hand side face and formed with a pin hole 27b each. Also, a flange 27d having a pin hole 27c protrudes from the left-hand side face of the insertion member 27.

On the other hand, the insertion member 28 has a flange 28a which protrudes from its left-hand side face so as to be situated between the engaging pieces 27a of the insertion member 27. The flange 28a is formed with a pin hole 28b in a position corresponding to the pin holes 27b. Also, a pair of engaging pieces 28d, having a pin hole 28c each, protrude from the right-hand side face of the insertion member 28.

The insertion members 27 and 28 are connected to each other in a manner such that the guide pins are held individually in the retaining holes 27e and 28e in advance, the flange 28a is located between the engaging pieces 27a, and a connecting pin 29 is passed through the pin holes 27b and 28b. In like manner, a plurality of insertion members 27 and 28 are connected to one another in the crosswise direction.

Thus, with use of the connected insertion members 27 and 28, the guide pins can be inserted at a stroke into a plurality of pin holes of a plurality of multifiber connectors arranged in the crosswise direction.

In inserting the guide pins at a stroke into a laminate connector which is formed of a plurality of multifiber connectors stacked in layers, on the other hand, the insertion members must be vertically stacked in layers. The following is a description of examples of the laminate-type insertion members as a sixth embodiment of the present invention.

Figure 26:
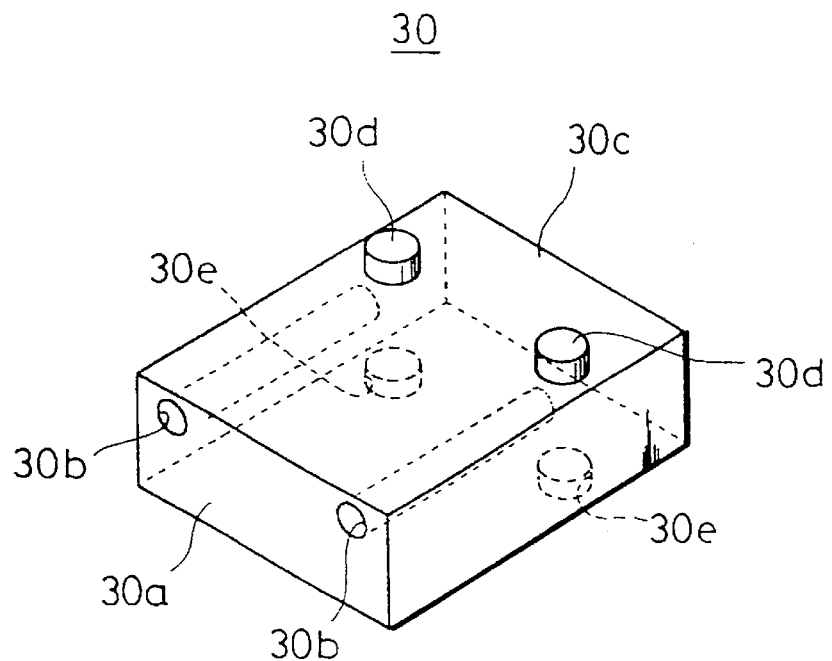
FIG. 26 is a perspective view showing a pin insertion member for lamination according to a sixth embodiment of the present invention.

First, an insertion member 30 shown in FIG. 26 is formed of a flexible material, such as expanded plastics (e.g., polyethylene, urethane, etc.) or rubber (e.g., natural rubber, synthetic rubber, etc.), and has the shape of a flat rectangular parallelepiped. The insertion member 30 has two retaining holes 30b which open in a front end face 30a and extend substantially to the center in the longitudinal direction. Each retaining hole 30b is biased to the side of an upper surface 30c, and the distance between the retaining holes 30b is equal to that between the pin holes of the multifiber connector. The insertion member 30 is formed with two columnar projections 30d, located individually on the opposite sides of the upper surface 30c at the rear portion with respect to the longitudinal direction, and two recesses 30e in the corresponding positions on the lower surface. In the insertion member 30, the height of each projection 30d is greater than the depth of each recess 30e.

Thus, a plurality of insertion members 30 can be stacked in layers with narrow gaps in the vertical direction in a manner such that the guide pins are inserted individually into the retaining holes 30b in advance, and that the projections 30d and the recesses 30e of the adjacent insertion members engage one another. The guide pins can be inserted at a stroke into the pin holes of a plurality of multifiber connectors by causing the insertion members 30 in this state to butt against the laminate connector. After the guide pins are inserted, each insertion member 30 can be easily disengaged from the two guide pins in a manner such that the regions between the retaining holes 30b and the upper surface 30c are fractured by the guide pins as the respective rear portions of the insertion members 30 are depressed ascendingly, as described in connection with the foregoing embodiments.

Figure 27:
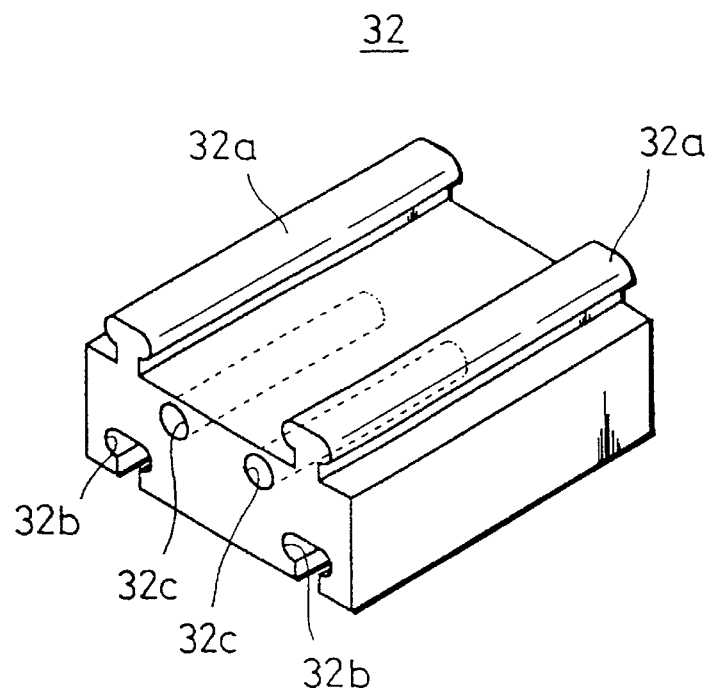
FIG. 27 is a perspective view showing a modification of the sixth embodiment.

FIG. 27 shows an insertion member 32 which has ridges 32a and grooves 32b extending in the butting direction and arranged on its upper and lower surfaces, respectively. In this case, a plurality of insertion members 32 can be vertically stacked in layers in a manner such that the respective ridges 32a and grooves 32b of the adjacent insertion members are in engagement with one another. Thus, the guide pins can be inserted at a stroke into the pin holes of a plurality of multifiber connectors which constitute the laminate connector if they are held individually in a pair of retaining holes 32c of each insertion member 32. The insertion members 32 are formed of the same material as the insertion members 30.

Figure 28:
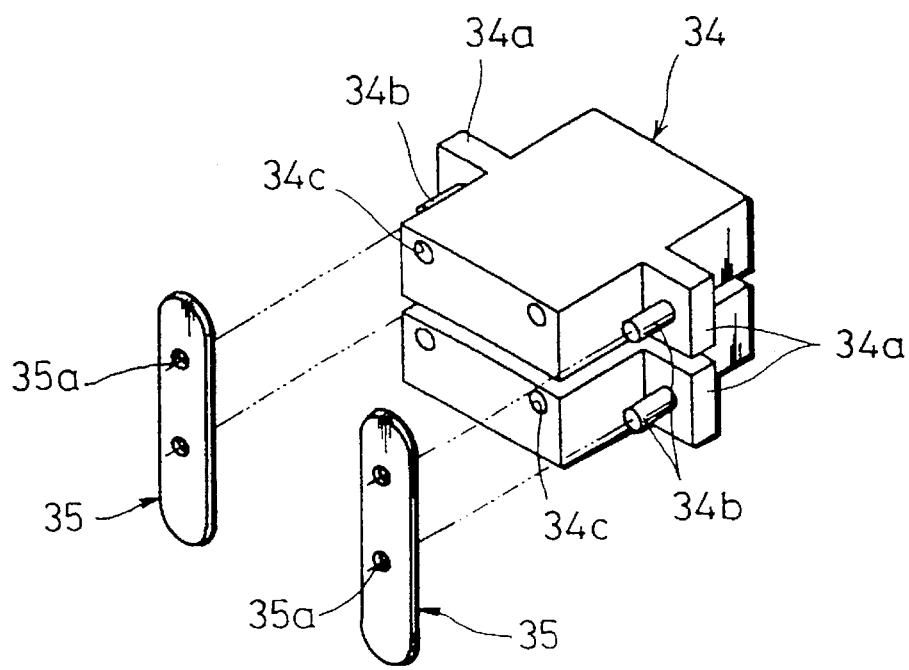
FIG. 28 is a perspective view showing another modification of the sixth embodiment in which pin insertion members are stacked in layers by means of laminating plates.

FIG. 28 shows insertion members 34, each having collar portions 34a of the same material as the insertion members 30 formed integrally on the opposite sides thereof with respect to the crosswise direction. Each collar portion 34a is provided with a laminating projection 34b which extends in the butting direction. As shown in FIG. 28, a plurality of insertion members 34 are vertically stacked in layers by means of two laminating plates 35 in a manner such that the laminating projections 34b are passed through their corresponding engaging holes 35a of the plates 35. Thus, the insertion members 34, like the insertion members 32, enable the guide pins to be inserted at a stroke into the pin holes of a plurality of multifiber connectors which constitute a laminate connector. In this case, each laminating plate 35 is formed with a plurality of engaging holes 35a as many as the stacked insertion members 34. The laminating plates 35 are formed of, for example, plastics (e.g., moldings of ABS, PP, PE, etc.) or metal (e.g., castings or machined product of iron, aluminum, etc.). In FIG. 28, numeral 34c denotes a retaining hole for holding a guide pin.

Figure 29:
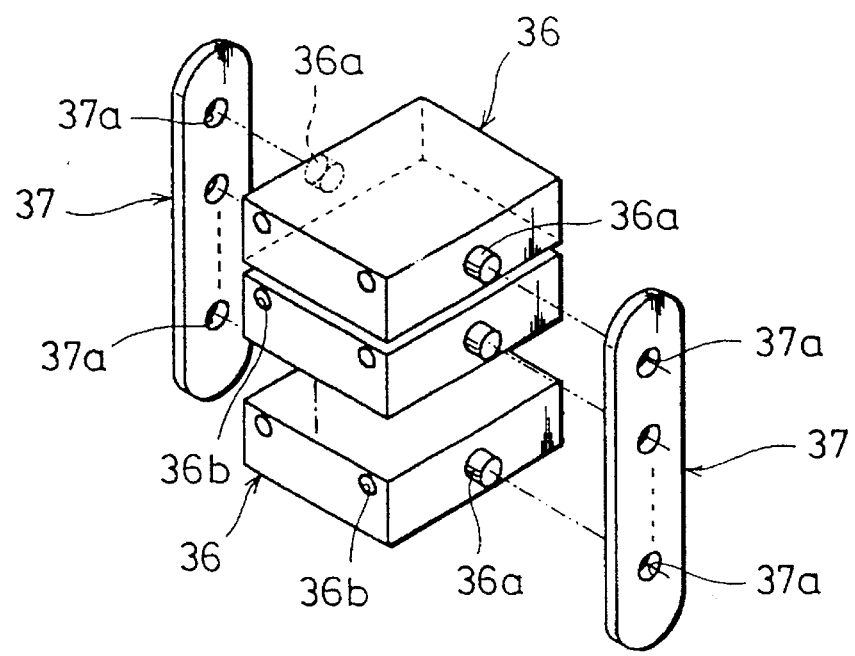
FIG. 29 is a perspective view showing still another modification of the sixth embodiment in which pin insertion members are stacked in layers by means of laminating plates.

FIG. 29 shows insertion members 36, each having laminating projections 36a of the same material as the insertion members 30 formed on the opposite sides thereof with respect to the crosswise direction. As shown in FIG. 29, a plurality of insertion members 36 are vertically stacked in layers by means of two laminating plates 37 in a manner such that the laminating projections 36a are passed through their corresponding engaging holes 37a of the plates 37. Thus, the insertion members 36, like the insertion members 34, enable the guide pins to be inserted at a stroke into the pin holes of a plurality of multifiber connectors which constitute a laminate connector. The laminating plates 37 are formed of the same material as the laminating plates 35. In FIG. 29, numeral 36b denotes a retaining hole for holding a guide pin.

The insertion members 34 and 36 shown in FIGS. 28 and 29 may be sandwiched vertically by attaching a U-shaped elastic clip (not shown) thereto from behind after they are vertically stacked in layers. In this arrangement, the elastic clip further stabilize the state of lamination of the stacked insertion members 34 or 36.

Figure 30:
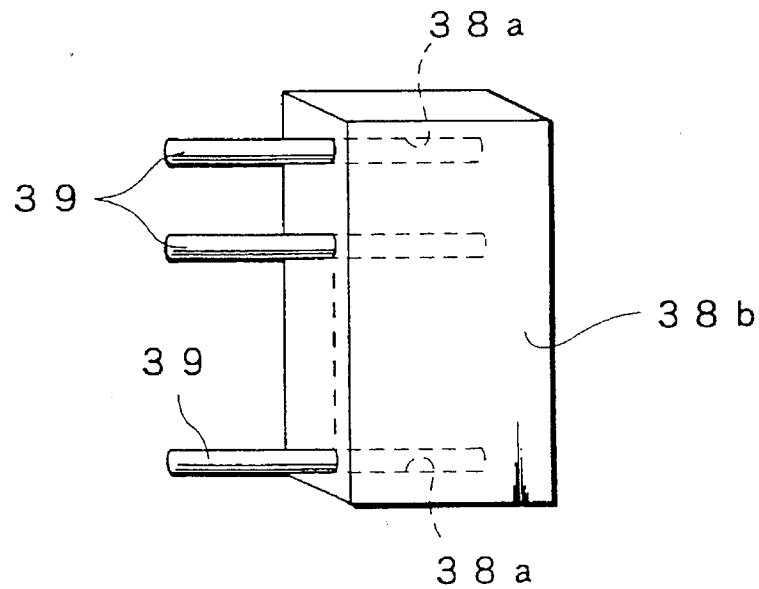
FIG. 30 is a perspective view showing a further modification of the pin insertion member of the sixth embodiment whereby guide pins are inserted at a stroke into pin holes of a plurality of multifiber connectors which constitute a laminate connector.
Figure 31:
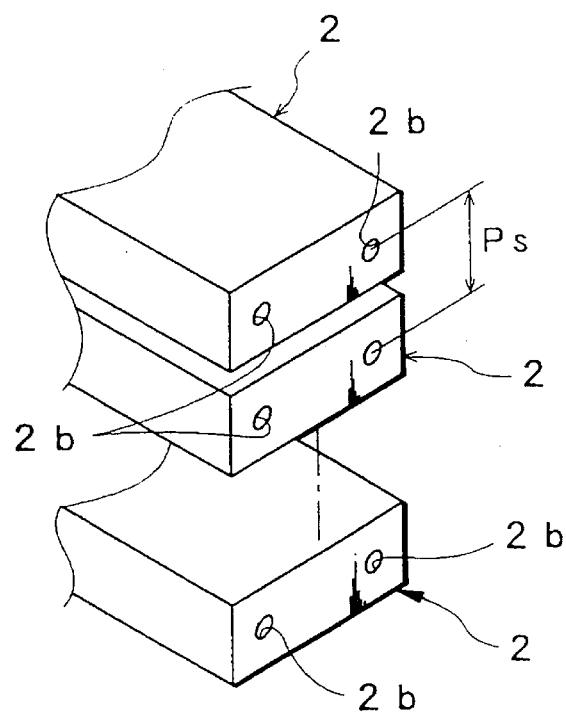
FIG. 31 is a perspective view showing a plurality of multifiber connectors stacked in layers.

FIG. 30 shows an insertion member 38 having a plurality of retaining holes 38a for guide pins 39 which are located with a bias toward one side face 38b. The intervals between the retaining holes 38a are equal to lamination intervals Ps (see FIG. 31) of a plurality of multifiber connectors 2 which constitute a laminate connector. Thus, the insertion member 38, like the insertion members 34, enables the guide pins 39 to be inserted at a stroke into the pin holes 2b of the multifiber connectors 2 stacked in layers at the lamination intervals Ps.

Thereupon, the insertion member 38, having the guide pins 39 inserted therein, can be easily disengaged from the guide pins 39 in a manner such that the regions between the retaining holes 38a and the side face 38b are fractured by the guide pins 39 as the rear portion of the insertion member 38 are pushed to the back of the drawing plane of FIG. 30, as described in connection with the foregoing embodiments.

Figure 32:
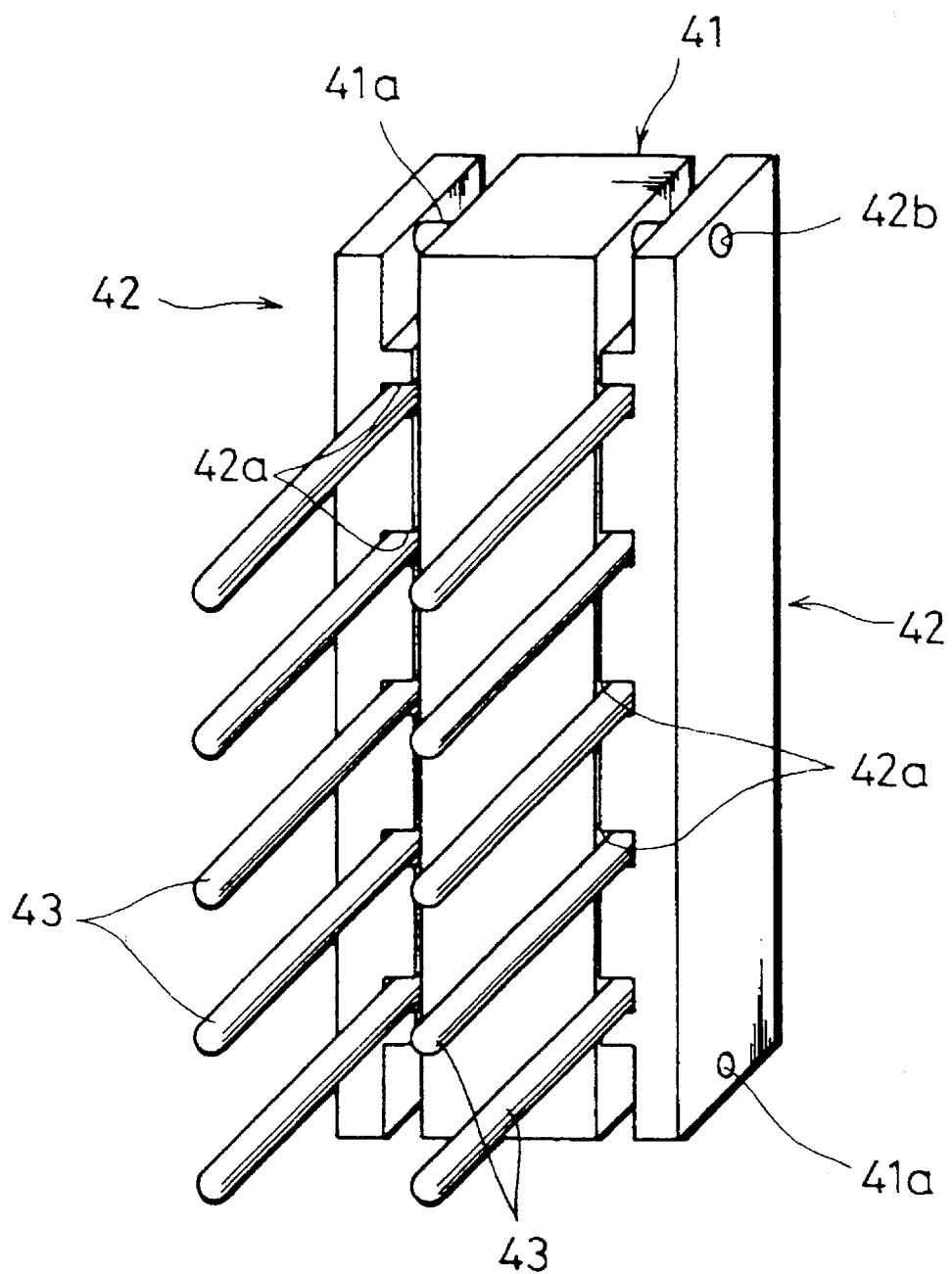
FIG. 32 is a perspective view showing a pin insertion member according to an alternate embodiment of the present invention.
Figure 33:
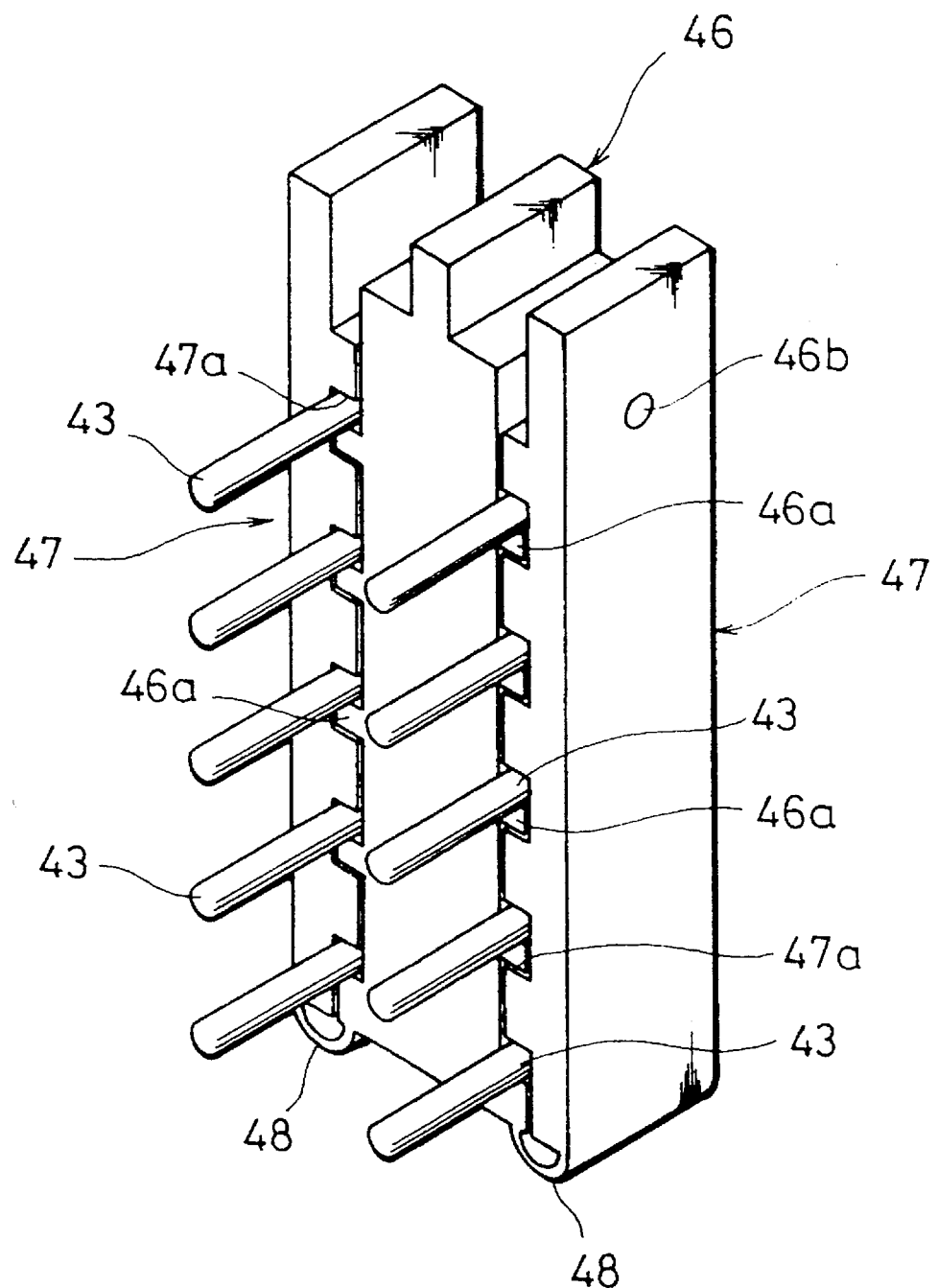
FIG. 33 is a perspective view of a pin insertion member according to a variation of the alternate embodiment of the present invention shown in FIG. 32.
Figure 34:
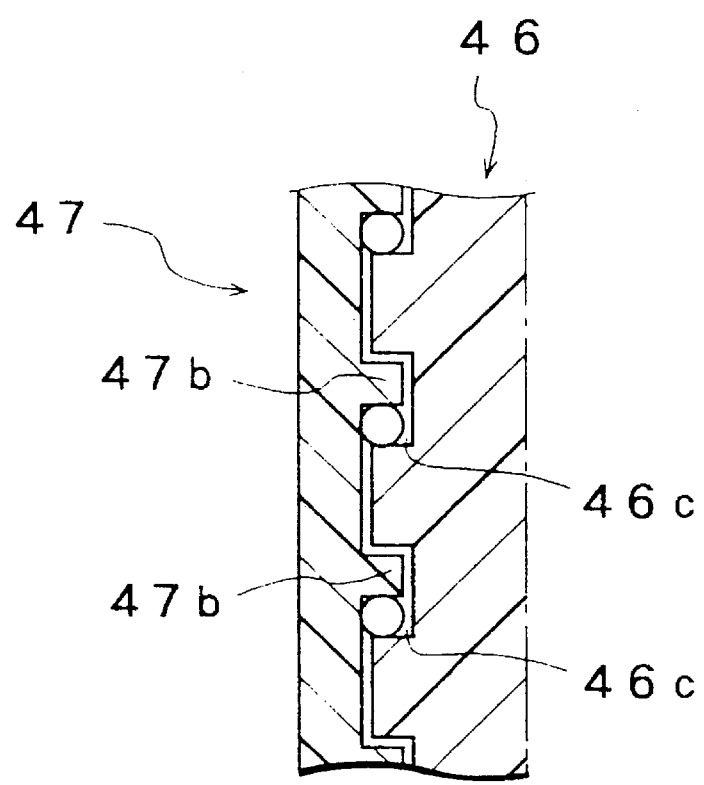
FIG. 34 is a sectional view showing another example of a retaining member of the pin insertion member of FIG. 33.

Referring now to FIGS. 32 to 34, insertion members according to an alternate embodiment of the present invention will be described such that guide pins are inserted at a stroke into pin holes of a plurality of multifiber connectors stacked in layers.

FIG. 32 shows an insertion member 40 which is provided with a regulating member 41 and two retaining members 42 removably mounted on the opposite sides of the member 41, individually. This insertion member 40 is used in inserting guide pins 43 at a stroke into, for example, five multifiber connectors (not shown) stacked in layers.

The regulating member 41 is formed of metal (e.g., castings or machined product of iron, aluminum, etc.), and has the shape of a rectangular prism. The member 41 is used to regulate the pitches of the guide pins inserted in the pin holes of the multifiber connectors. Lateral engaging pins 41a are attached individually to the upper and lower portions of the regulating member 41.

The retaining members 42 are members which, in conjunction with the regulating member 41, hold the guide pins 43 so that one end of each guide pin projects, and are formed of a flexible material, such as expanded plastics (e.g., polyethylene, urethane, etc.), rubber (e.g., natural rubber, synthetic rubber, etc.), vinyl (e.g. PVC loaded with plasticizer, etc.), or paper. Each retaining member 42 is formed with five parallel horizontal arrangement grooves 42a for the guide pins 43, on its side face opposite the regulating member 41. Also, each retaining member 42 is formed having upper and lower fitting holes 42b in which the extreme end portions of their corresponding engaging pins 41a are fitted. It is to be understood that the vertical intervals between the arrangement grooves 42a are equal to the vertical intervals between the pin holes of the stacked multifiber connectors.

The insertion member 40, constructed in this manner, is used in the following manner in inserting the guide pins 43 at a stroke into the pin holes, ten in total number, of the five stacked multifiber connectors.

First, the guide pins 43 are introduced individually into the arrangement grooves 42a of each retaining member 42, the retaining members 42 are attached laterally to the regulating member 41, and the respective end portions of the engaging pins 41a are fitted individually into the fitting holes 42b.

In this manner, the insertion member 40 holds the ten guide pins 43 in two vertical rows at the vertical intervals corresponding to the pitches between the pin holes of the multifiber connectors, as shown in FIG. 32.

Subsequently, when the insertion member 40 is caused to butt against the stacked multifiber connectors, the guide pins 43 are inserted individually into the pin holes. Since the guide pins 43 are held firmly by the regulating member 41 and the two retaining members 42 at this point of time, they can never be dislocated as they are handled during the insertion operation.

When the retaining members 42 are laterally pulled away from the regulating member 41 after the insertion of the guide pins 43 into the pin holes of the multifiber connectors is completed, the fitting holes 42b are disengaged from the engaging pins 41a. Thereupon, the insertion member 40 is removed from the stacked multifiber connectors.

In the operation described above, the guide pins 43 are held beforehand by means of the insertion member 40, so that only the insertion member 40 is handled without allowing the pins 43 to be handled during the insertion operation, so that there is no possibility of the pins being lost.

After the insertion member 40 is used, the guide pins 43 are introduced again into the arrangement grooves 42a of its retaining members 42, and the retaining members 42 are attached laterally to the regulating member 41. Thereupon, the insertion member 40 is assembled with the guide pins 43 held therein.

Although the five stacked multifiber connectors are stacked in layers according to the present embodiment, the invention is not limited to this arrangement, and may be also applied to a laminate connector including any other desired number of multifiber connectors by changing the length of the regulating member 41 and the retaining members 42.

According to the alternate described above, moreover, each pair of guide pins 43, right and left, are inserted simultaneously. Alternatively, however, the guide pins 43 on each side may be inserted at a time by using only one of the retaining members 42.

FIG. 33 shows an insertion member 45 which is a one-piece molded plastic product formed of a regulating member 46 and two retaining members 47 connected to one another by means of hinges 48.

The regulating member 46 is a rectangular prism-shaped member for regulating the pitches of the guide pins inserted in the pin holes of the multifiber connectors. Horizontal support lugs 46a for supporting the guide pins 43 at predetermined vertical intervals protrude individually from the opposite sides of the regulating member 46, and engaging pins 46b are attached to the upper portions of the member 46.

Each retaining member 47 is formed with five parallel horizontal holding grooves 47a, which correspond to the support lugs 46a, for the guide pins 43, on its side face opposite the regulating member 46. Also, each retaining member 47 is formed having a fitting hole in which the extreme end portion of its corresponding engaging pin 46b is fitted.

The hinges 48 connect the respective lower portions of the regulating member 46 and the retaining members 47.

In using the insertion member 45, therefore, the respective end portions of the engaging pins 46b are disengaged from the fitting holes, and the retaining members 47 are thrown down sideways.

Then, the retaining members 47 are raised up, and the end portions of the engaging pins 46b of the regulating member 46 are fitted individually into the fitting holes of the retaining members 47 so that the members 46 and 47 are joined into an integral body. Thereafter, the guide pins 43 are introduced individually into spaces defined between the inner walls of the holding grooves 47a and the support lugs 46a, whereupon the insertion member 45 is assembled in the state shown in FIG. 33.

Alternatively, the insertion member 45 may be assembled in the following manner. The guide pins 43 are introduced individually into the holding grooves 47a of the retaining members 47, and the retaining members 47 are raised up. Thereupon, the end portions of the engaging pins 46b are fitted individually into the fitting holes of the retaining members 47, and the support lugs 46a of the regulating member 46 are fitted individually into the lower parts of the holding grooves 47a. Thus, the guide pins 43 are held by the inner walls of the grooves 47a and the support lugs 46a, whereupon the insertion member 45 is assembled in the state shown in FIG. 33.

Thus, with use of the insertion member 45 according to the present embodiment, each two horizontally extending guide pins 43 can be positioned with high accuracy, and accurate pitches of arrangement can be secured for the guide pins 43.

When the insertion member 45 in this state is caused to butt against the stacked multifiber connectors, the guide pins 43 are inserted at a stroke into the pin holes.

Subsequently, when the top portions of the retaining members 47 are pulled sideways to be separated from the regulating member 46, the fitting holes are disengaged from the engaging pins 46b. As a result, the insertion member 45 is removed from the stacked multifiber connectors.

Thus, in the insertion member 45 according to the present embodiment, the regulating member 46 and the two retaining members 47 are connected integrally by means of the hinges 48. Accordingly, there is no possibility of the members being lost, so that component management is easy.

In the insertion member 45, moreover, the support lugs 46a of the regulating member 46 may be omitted so that the width or depth of each holding groove 47a of each retaining member 47 is substantially equal to the diameter of each guide pin 43.

As shown in FIG. 34, furthermore, the insertion member 45 may be formed with holding grooves 46c for the guide pins 43 on the side of the regulating member 46 and support lugs 47b on the side of each retaining member 47.

What is claimed is:

1. A pin insertion member for inserting guide pins into pin holes of an optical fiber connector, comprising:

a retaining portion for holding at least two guide pins such that one-end portions of said at least two guide pins project from said retaining portion, said retaining portion including retaining holes for holding other-end portions of said at least two guide pins with a predetermined space therebetween in a widthwise direction;

said pin insertion member having a plurality of slits between said retaining holes and an outer surface of said retaining portion, whereby said at least two guide pins are adapted to be insertable at a stroke into corresponding pin holes of an optical fiber connector.

2. A pin insertion member according to claim 1, wherein said slits are formed between said retaining holes and an outer surface of said retaining portion nearest to said retaining holes.

3. A pin insertion member according to claim 1, wherein each of said plurality of slits is formed along an entire length between said outer surface of said retaining portion and each corresponding one of said retaining holes.

4. A pin insertion member according to claim 1, wherein each of said plurality of slits is formed to extend intermittently in a longitudinal direction between said outer surface of said retaining portion and each corresponding one of said retaining holes.

5. A pin insertion member according to claim 1, wherein each of said plurality of slits comprises a cut between said outer surface and each corresponding one of said retaining holes on a side of said outer surface or said corresponding one of said retaining holes.

6. A pin insertion member for inserting guide pins into pin holes of an optical fiber connector, comprising:

a retaining portion for holding at least two guide pins such that one-end portions of said at least two guide pins project from said retaining portion, said retaining portion including retaining holes for holding other-end portions of said at least two guide pins with a predetermined space therebetween in a widthwise direction;

said pin insertion member having fracture grooves on portions of an outer surface of said retaining portion positioned adjacent to said retaining holes, whereby said at least two guide pins are adapted to be insertable at a stroke into corresponding pin holes of an optical fiber connector.

7. A pin insertion member for inserting guide pins into pin holes of an optical fiber connector comprising:

a retaining portion for retaining at least two guide pins such that one-side end portions of said at least two guide pins project from said retaining portion and other-side end portions of said at least two guide pins are held in said retaining portion, whereby said at least two guide pins are adapted to be insertable at a stroke into corresponding pin holes of an optical fiber connector;

said retaining portion including a retaining surface on an outer surface thereof with respect to a thickness direction, and said at least two guide pins are held by retaining means removably mounted on said retaining surface.

8. A pin insertion member according to claim 7, wherein said retaining means comprises an adhesive tape mounted on said retaining surface.

9. A pin insertion member according to claim 7, wherein said retaining means comprises an elastic cover coupled to said retaining surface by means of adhesive means.

10. A pin insertion member according to claim 7, wherein said pin insertion member comprises positioning grooves for positioning said at least two guide pins on said retaining surface.

11. A pin insertion member for inserting guide pins into pin holes of an optical fiber connector comprising:

a retaining portion for retaining at least two guide pins such that one-side end portions of said at least two guide pins project from said retaining portion and other-side end portions of said at least two guide pins are held in said retaining portion, whereby said at least two guide pins are adapted to be insertable at a stroke into corresponding pin holes of an optical fiber connector;

said retaining portion including a retaining surface on an outer surface thereof with respect to a thickness direction, and said pin insertion member comprises a magnet formed with positioning grooves for positioning said at least two guide pins on said retaining surface.

12. A pin insertion member for inserting guide pins into pin holes of an optical fiber connector comprising:

a retaining portion for retaining at least two guide pins such that one-side end portions of said at least two guide pins project from said retaining portion and other-side end portions of said at least two guide pins are held in said retaining portion, whereby said at least two guide pins are adapted to be insertable at a stroke into corresponding pin holes of an optical fiber connector;

said pin insertion member comprising connecting portions respectively provided on opposite sides of said retaining portion with respect to a crosswise direction thereof, said connecting portions being adapted to connect said pin insertion member with another pin insertion member.

13. A pin insertion member for inserting guide pins at a stroke into pin holes of a plurality of optical fiber connectors stacked in layers, each said optical fiber connector having at least two pin holes formed with a predetermined pitch, said pin insertion member comprising:

a regulating member for regulating a pitch of said guide pins to be inserted into the pin holes of said optical fiber connectors; and retaining members removably mounted on opposite sides of said regulating member, individually, and serving, in conjunction with said regulating member, to hold said guide pins so that one-side end portions of said guide pins project.

14. A pin insertion member according to claim 13, wherein said pin insertion member comprises a molded resin product formed of said regulating member and said retaining members connected by means of hinges.

* * * * *